United States Patent
Suhail et al.

(10) Patent No.: US 11,558,210 B2
(45) Date of Patent: Jan. 17, 2023

(54) SYSTEMS AND METHODS FOR INITIATING ACTIONS BASED ON MULTI-USER CALL DETECTION

(71) Applicant: Slack Technologies, LLC, San Francisco, CA (US)

(72) Inventors: Salman Suhail, San Francisco, CA (US); Robyn Rapp, Sausalito, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 16/514,949

(22) Filed: Jul. 17, 2019

(65) Prior Publication Data

US 2020/0036544 A1 Jan. 30, 2020

Related U.S. Application Data

(60) Provisional application No. 62/702,985, filed on Jul. 25, 2018.

(51) Int. Cl.
*G06F 15/16* (2006.01)
*H04L 12/18* (2006.01)

(52) U.S. Cl.
CPC ...... *H04L 12/1822* (2013.01); *H04L 12/1818* (2013.01); *H04L 12/1827* (2013.01)

(58) Field of Classification Search
CPC ............. H04L 12/1822; H04L 12/1818; H04L 12/1827; G06Q 10/10; G06Q 10/1093
See application file for complete search history.

(56) References Cited

U.S. PATENT DOCUMENTS

| 8,917,355 B1 | 12/2014 | Mo et al. |
| 9,685,190 B1 | 6/2017 | Fishkin et al. |
| 10,165,110 B1* | 12/2018 | Garcia ................... H04M 3/382 |
| 2008/0225870 A1* | 9/2008 | Sundstrom ............. G06Q 10/10 |
| | | 370/401 |
| 2013/0226578 A1 | 8/2013 | Bolton et al. |

(Continued)

OTHER PUBLICATIONS

G. Eichler, K.-H. Lüke and B. Reufenheuser, "Context information as enhancement for mobile solutions and services," 2009 13th International Conference on Intelligence in Next Generation Networks, 2009, pp. 1-5 (Year: 2009).*

(Continued)

*Primary Examiner* — Oscar A Louie
*Assistant Examiner* — Messeret F Gebre
(74) *Attorney, Agent, or Firm* — Holland & Hart LLP

(57) ABSTRACT

A group-based communication platform is configured to detect one or more recurring calls performed via a calling system, such as an external calling platform, and to perform one or more follow-up actions upon detecting a recurring call. The group-based communication platform receives call data for one or more calls, such as previously completed calls or future scheduled calls. The group-based communication platform is further configured to identify user profiles associated with one or more calls, to thereby identify user profiles associated with one or more recurring calls. Thus, the one or more follow-up actions executed by the group-based communication platform for a recurring call is associated with one or more user profiles that are correlated with a recurring call.

21 Claims, 5 Drawing Sheets

(56) References Cited

U.S. PATENT DOCUMENTS

| | | | | |
|---|---|---|---|---|
| 2015/0347980 | A1* | 12/2015 | White | G06Q 10/1095 |
| | | | | 705/7.19 |
| 2016/0357761 | A1* | 12/2016 | Siracusa | G06F 16/3322 |
| 2016/0358126 | A1* | 12/2016 | Bostick | G06Q 10/1095 |
| 2017/0068906 | A1* | 3/2017 | Korycki | G06Q 10/107 |
| 2017/0244984 | A1 | 8/2017 | Aggarwal et al. | |
| 2018/0287982 | A1 | 10/2018 | Draeger et al. | |
| 2020/0329140 | A1* | 10/2020 | Feuz | H04M 1/72484 |

OTHER PUBLICATIONS

Teinmann, G., & de Freitas Filho, Paulo Jose. (2013). Using simulation to evaluate call forecasting algorithms for inbound call center (Year: 2013).*

T. Liu and L. Liu, "Research on Forecasting Call Center Traffic through PCA and BP Artificial Neural Network," 2012 Fifth International Symposium on Computational Intelligence and Design, 2012, pp. 444-447 (Year: 2012).*

H. Yoshii, Y. Nomura and H. Taniguchi, "A Practical Method for Forecasting the Future Calendar Events of Ambiguous Recurrence," 2012 Seventh International Conference on Broadband, Wireless Computing, Communication and Applications, 2012, pp. 638-643 (Year: 2012).*

"Die, Email, Die! A Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 2 pages.

"How Slack changed the way we work by putting the customer experience first", Repeat Customer Podcast, Episode 3, [online][retrieved May 9, 2019]. Retrieved from the Internet: <URL:https://www.zendesk.com/resources/slack-customer-experience/, (2019) 13 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.

David Auberbach, "Re-Animator. How Stewart Butterfield created Flickr and Slack out of the ashes of failed projects" [online][retrieved May 9, 2019]. Retrieved from the Internet: <URL:https://slate.com/business/2014/05/stewart-butterfield-flickr-and-slack-how-he-snatched-victory-from-the-jaws-of-defeat.html>. (dated May 28, 2014, 2:48 PM) 8 pages.

Ernie Smith, "Picking Up the Slack", TEDIUM, [online][retrieved May 9, 2019], Retrieved from the Internet: <URL:https://tedium.co/2017/10/17/irc-vs-slack-chat-history/>. (dated Oct. 17, 2017) 8 pages.

Internet Relay Chat, Wikipedia, [online][retrieved May 30, 2019]. Retrieved from the Internet: <URL:https://en.wikipedia.org/wiki/Internet_Relay_Chat> (dated May 28, 2019) 17 pages.

Jonathan Vanian, "Why these startups think chat apps are the next big thing in workplace collaboration", GIGAOM, Lexisnexis, https://advance.lexis.com/api/permalink/e83778c8-09c8-43aa-9ba0-88526283de69/?context=1000516, (dated Aug. 1, 2014, 5:45 PM) 4 pages.

Matsumoto, T. et al., "Chocoa Communicator—A New Communication System Based on Awareness and Text Communications-", FUJITSU Sci. Tech. J., 36, 2, (Dec. 2000) 154-161.

Matthew Ingram, "Flickr co-founder launches Slack, an all-in-one messaging tool designed to kill email forever", GIGAOM, Lexisnexis, https://advance.lexis.com/api/permalink/0b676b7c-aec3-4560-861e-d030d1dd008c/?context=1000516, (dated Feb. 12, 2014, 7:03 PM), 2 pages.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Mike Issac, "Slack, a Start-Up With an App to Foster Business Collaboration, is Valued at $1.1 Billion", The New York Times Blogs (Bits), Lexisnexis, https://advance.lexis.com/api/permalink/3eb84b34-a8f9-4d7d-9573-89d9598a4963/?context=1000516>. (dated Oct. 31, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL:https://www.rfc-editor.org/rfc/rfc1459.txt>. (dated May 1993) 66 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 2 pages.

Robert Hof, "Stewart Butterfield on How Slack Became a $2.8 Billion Unicorn", FORBES, [online][retrieved May 9, 2019], Retrieved from the Internet: <URL:https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

* cited by examiner

SYSTEMS AND METHODS FOR INITIATING ACTIONS BASED ON MULTI-USER CALL DETECTION

CROSS-REFERENCE TO RELATED APPLICATIONS

This patent application claims priority from U.S. Provisional Appl. Ser. No. 62/702,985, filed Jul. 25, 2018, which is incorporated herein by reference in its entirety.

BACKGROUND

Various systems and devices have historically enabled users to schedule and hold calls (e.g., audio-only calls or video and audio calls) across separate electronic devices. However, existing systems and devices have provided limited functionality for users.

Through applied effort, ingenuity, and innovation many deficiencies of such systems have been solved by developing solutions that are in accordance with the embodiments of the present invention, many examples of which are described in detail herein.

BRIEF SUMMARY

Various embodiments are directed to systems and methods for providing enhanced functionality for call users by detecting characteristics of calls, identifying recurring calls, and providing enhanced data sharing functionality for typical participants of those recurring calls via a group-based communication platform, regardless of whether those calls are performed via integrated call functionalities of the group-based communication platform or via third-party calling systems.

Various embodiments are directed to a system configured for initiating an action within a group-based communication platform for a recurring call. In certain embodiments, the system comprises: one or more non-transitory memory storage repositories; and one or more processors, wherein the one or more processors are collectively configured to: receive calendar data identifying a plurality of calls between a plurality of users, wherein calendar data for each of the one or more calls comprises call characteristic data for each respective call; correlate calendar data of one or more of the plurality of calls with one or more user profiles stored in association with the group-based communication platform; detect, via machine-learning, one or more recurring calls from the plurality of calls, wherein a recurring call comprises a series of calls detected within the plurality of calls; and initialize one or more follow-up actions within the group-based communication platform for each of the one or more recurring calls, wherein the one or more follow-up actions are associated with one or more user profiles correlated with calendar data of the one or more recurring calls.

In various embodiments, the calendar data comprises historical calendar data indicative of previously completed calls. Moreover, the one or more processors may be further configured to: identify, based at least in part on call data generated while a present call is ongoing, one or more user profiles associated with users connected to the present call. In certain embodiments, the call data is generated by an external call system hosting the present call; and wherein identifying one or more user profiles associated with users connected to the present call comprises: receiving, from the external call system, user identifiers associated with users connected to the present call; and mapping the user identifiers with one or more user profiles stored in association with the group-based communication platform.

In certain embodiments, the one or more processors are further configured to classify each of the user profiles relative to a corresponding recurring call; and wherein initializing one or more follow-up actions comprises selecting a follow-up action based at least in part on classifications of each of the user profiles relative to a corresponding recurring call. In various embodiments, classifying each of the user profiles comprises classifying each of the user profiles as one of: an active participate of a recurring call or an inactive participant of the recurring call. In accordance with certain embodiments, detecting one or more recurring calls comprises detecting one or more recurring calls based at least in part on identifying a plurality of calendar events within the calendar data having shared call characteristic data. In various embodiments, the one or more follow-up actions comprises generating a communication channel within the group-based communication platform for a recurring call and inviting each of the plurality of user identifiers associated with the recurring call to join the communication channel.

Various embodiments are directed to a computer program product for initiating an action within a group-based communication platform for a recurring call, the computer program product comprising at least one non-transitory computer-readable storage medium having computer-readable program code portions stored therein, the computer-readable program code portions comprising an executable portion configured to: receive calendar data identifying a plurality of calls between a plurality of users, wherein calendar data for each of the one or more calls comprises call characteristic data for each respective call; correlate calendar data of one or more of the plurality of calls with one or more user profiles stored in association with the group-based communication platform; detect, via machine-learning, one or more recurring calls from the plurality of calls, wherein a recurring call comprises a series of calls detected within the plurality of calls; and initialize one or more follow-up actions within the group-based communication platform for each of the one or more recurring calls, wherein the one or more follow-up actions are associated with one or more user profiles correlated with calendar data of the one or more recurring calls.

In certain embodiments, the calendar data comprises historical calendar data indicative of previously completed calls. Moreover, the computer program product may further comprise an executable portion configured to: identify, based at least in part on call data generated while a present call is ongoing, one or more user profiles associated with users connected to the present call. In certain embodiments, the call data is generated by an external call system hosting the present call; and wherein identifying one or more user profiles associated with users connected to the present call comprises: receiving, from the external call system, user identifiers associated with users connected to the present call; and mapping the user identifiers with one or more user profiles stored in association with the group-based communication platform. In various embodiments, the computer program product further comprises an executable portion configured to classify each of the user profiles relative to a corresponding recurring call; and wherein initializing one or more follow-up actions comprises selecting a follow-up action based at least in part on classifications of each of the user profiles relative to a corresponding recurring call. In certain embodiments, classifying each of the user profiles comprises classifying each of the user profiles as one of: an active participate of a recurring call or an inactive participant of the recurring call. In various embodiments, detecting one or more recurring calls comprises detecting one or more recurring calls based at least in part on identifying a plurality of calendar events within the calendar data having shared call characteristic data. In certain embodiments, the one or more follow-up actions comprises generating a communication channel within the group-based communication platform for a recurring call and inviting each of the plurality of user identifiers associated with the recurring call to join the communication channel.

Various embodiments are directed to a computer-implemented method for initiating an action within a group-based communication platform for a recurring call, wherein the method comprises: receiving calendar data identifying a plurality of calls between a plurality of users, wherein calendar data for each of the one or more calls comprises call characteristic data for each respective call; correlating calendar data of one or more of the plurality of calls with one or more user profiles stored in association with the group-based communication platform; detecting, via machine-learning, one or more recurring calls from the plurality of calls, wherein a recurring call comprises a series of calls detected within the plurality of calls; and initializing one or more follow-up actions within the group-based communication platform for each of the one or more recurring calls, wherein the one or more follow-up actions are associated with one or more user profiles correlated with calendar data of the one or more recurring calls.

In various embodiments, the calendar data comprises historical calendar data indicative of previously completed calls, and wherein detecting one or more recurring calls comprises detecting a series of calls comprising previously completed calls and future scheduled calls. Moreover, the method may further comprise identifying, based at least in part on call data generated while a present call is ongoing, one or more user profiles associated with users connected to the present call. In certain embodiments, the call data is generated by an external call system hosting the present call; and wherein identifying one or more user profiles associated with users connected to the present call comprises: receiving, from the external call system, user identifiers associated with users connected to the present call; and mapping the user identifiers with one or more user profiles stored in association with the group-based communication platform. In various embodiments, the method may further comprise classifying each of the user profiles relative to a corresponding recurring call; and wherein initializing one or more follow-up actions comprises selecting a follow-up action based at least in part on classifications of each of the user profiles relative to a corresponding recurring call. In certain embodiments, classifying each of the user profiles comprises classifying each of the user profiles as one of: an active participate of a recurring call or an inactive participant of the recurring call. In various embodiments, detecting one or more recurring calls comprises detecting one or more recurring calls based at least in part on identifying a plurality of calendar events within the calendar data having shared call characteristic data. Moreover, in certain embodiments, the one or more follow-up actions comprises generating a communication channel within the group-based communication platform for a recurring call and inviting each of the plurality of user identifiers associated with the recurring call to join the communication channel.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Glossary

Figure 1:
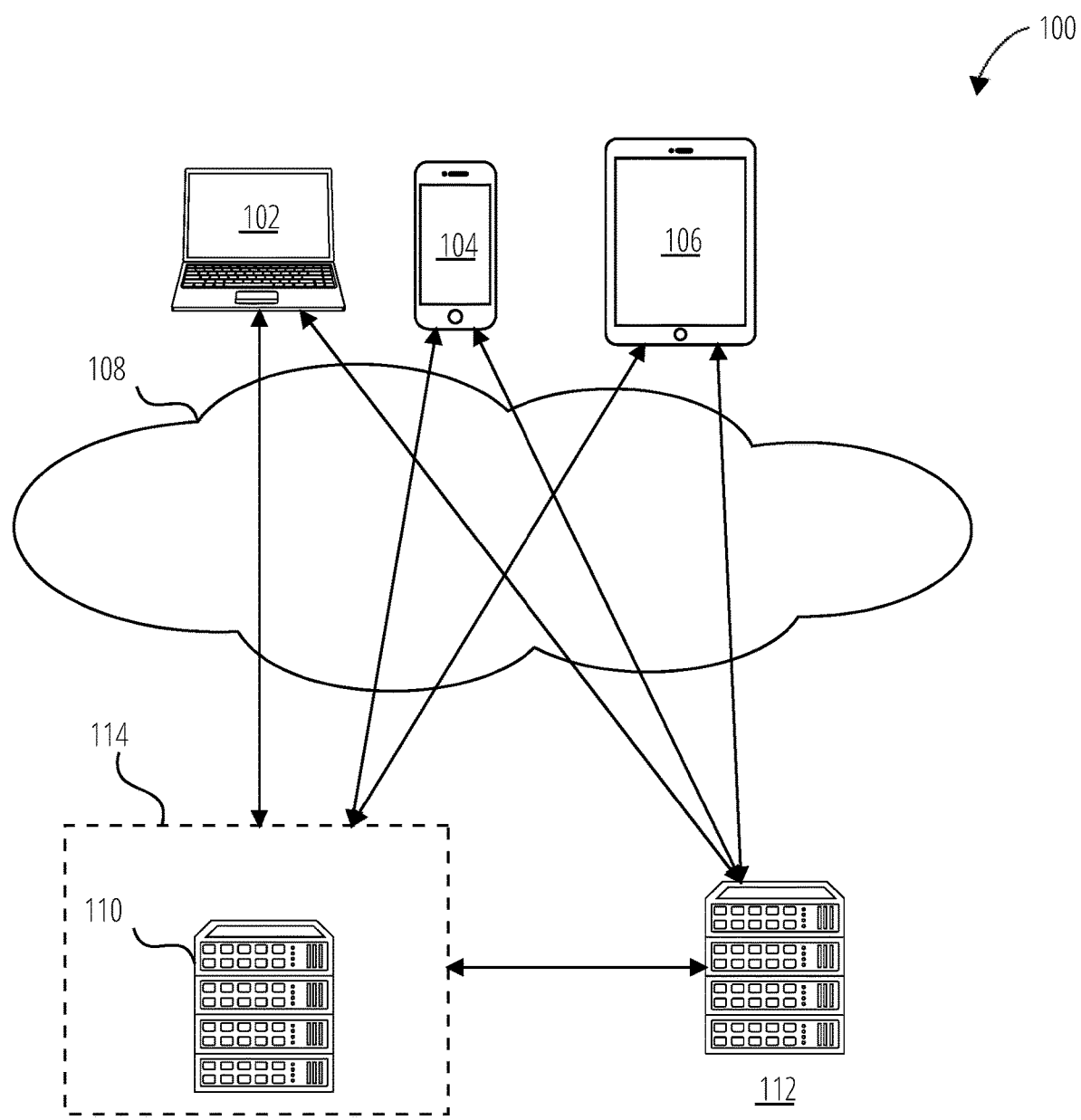
FIG. 1 illustrates a schematic view of a system 100 encompassing a group-based communication platform and one or more external call systems in communication with one or more client devices in accordance with one embodiment.

"Group identifier" in this context refers to one or more items of data by which a group within a group-based communication system may be identified. Group identifiers may also be referred to as "team identifiers" in certain embodiments. For example, a group identifier or team identifier may comprise ASCII text, a pointer, a memory address, and the like.

"Message distribution servers" in this context refers to computing devices configured for interacting with various client devices for receiving and/or disseminating messages for distribution within communication channels and/or for providing appropriate connectivity between client devices to enable calls therebetween. Message distribution servers may be configured to receive, store (in an associated database), and/or direct messages exchanged between users (operating via client devices). The functionality of the message distribution servers may be provided via a single server or collection of servers having a common functionality, or the functionality of the message distribution servers may be segmented among a plurality of servers or collections of servers performing subsets of the described functionality of the message distribution servers. For example, a first subset of message distribution servers may be configured for receiving messages from client devices and/or for transmitting messages to client devices (e.g., via one or more interface servers). These message distribution servers may be in communication with a second subset of message distribution servers configured for collecting messages distributed within communication channels and for storing those messages within a message repository database for indexing and archiving.

"External call system" in this context refers to a system operating via one or more servers which are in network communication with a group-based communication platform, and which service, manage, and/or perform actions that enable real-time calls (e.g., audio-only calls, video-calls, and/or the like) between a plurality of user computing entities. The external call systems may comprise additional storage repositories (e.g., databases) storing data enabling various call functionalities that may be performed via the external call system.

"Call" in this context refers to real-time audio and/or video-based communications between a plurality of client devices. Calls may be executed by connecting at least two client devices for real-time data transfer therebetween, by sharing video and/or audio collected via input devices of one of the client devices (e.g., a microphone and/or camera) via a user interface of the other client device(s) connected within the call. In certain embodiments, calls may be accompanied by messaging interfaces enabling text-based messages or other data to be transferred between client devices during the call.

A "user profile" in this context refers to information associated with a user, including, for example, a user identifier, one or more communication channel identifiers (e.g., group-based communication channel identifiers) associated with communication channels (e.g., group-based communication channels) that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., jdoe), a password, a time zone, a status, and the like. The term user profile may be used interchangably with "user account, and user account details." The user account details can include a subset designation of user credentials, such as, for example, login information for the user including the user's username and password.

"Client device" in this context refers to computer hardware(s) and/or software(s) that is/are configured to access one or more services made available by one or more servers. The server(s) is/are often (but not always) on another computer system, in which case the client device accesses the service by way of a network. A client device may be associated with a group identification, where the group identification is an electronic indication that suggests a group (e.g., user group) that the user belongs to. Client devices may include, without limitation, smart phones, tablet computers, laptop computers, desktop computers, wearable devices, personal computers, enterprise computers, and the like.

"Private group-based communication channel" in this context refers to a group-based communication channel with restricted access such that it is not generally accessible and/or searchable by other members of the group-based communication system. For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel.

"Message" in this context refers to any electronically generated digital content object provided by a user using a client device and that is configured for display within a group-based communication channel interface. Messages may also be referred to as "messaging communications" in certain embodiments. Messages may include or be embodied as any text, image, video, audio, files, interactive links, or combination thereof provided by a user (using a client device). For instance, the user may provide a messaging communication that includes text as well as an image and a video within the messaging communication as message contents. In such a case, the text, image, and video would comprise the messaging communication or digital content object. Each message sent or posted to a group-based communication channel of the group-based communication system includes metadata comprising the following: a sending user identifier, a message identifier, message contents, a group identifier, and a group-based communication channel identifier. Each of the foregoing identifiers may comprise ASCII text, a pointer, a memory address, and the like "Data" in this context refers to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like. Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

"Group-based communication channel interface" in this context refers to a virtual communications environment or feed that is configured to display messaging communications posted by channel members (e.g., validated users accessing the environment using client devices) that are viewable only to the members of the group. The format of the group-based communication channel interface may appear differently to different members of the group-based communication channel; however, the content of the group-based communication channel interface (i.e., messaging communications) will be displayed to each member of the group-based communication channel. For instance, a common set of group-based messaging communications will be displayed to each member of the respective group-based communication channel such that the content of the group-based communication channel interface (i.e., messaging communications) will not vary per member of the group-based communication channel.

A "user" in this context refers to an individual, a group of individuals, business, organization, and the like. Users may access a group-based communication or messaging system using client devices. "Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

"Communication channel" in this context refers to an information route and associated circuitry that is used for data exchange between and among systems and parts of systems. For example, a communication channel may be established between and among various client devices, allowing these client devices to communicate and share data between and among each other. These communication channels may be "group-based communication channels" established between and among a select group of client devices (and their respective users) for sharing messages among all users of the group. The communication channels may also and/or alternatively be one-to-one, direct message communication channels established between and among two client devices (and their respective users) for sharing messages among only those two users. Multiple communication channels may operate on each of one or more computing devices, and therefore a communication channel identifier may be assigned to a communication channel, which indicates the physical address in a database where related data of that communication channel is stored and which is utilized to identify client devices that participate within the communication channel to receive data exchanged on the communication channel. The communication channel identifier therefore ensures communication channels remain distinct and separate even on computing devices associated with a plurality of communication channels. A communication channel may be "public," which may allow any client device to join and participate in the information sharing through the communication channel. A communication channel may be "private," which may restrict data communications in the communication channel to certain client devices and/or users.

"Sending user identifier" in this context refers to a collection of messages that are sent by a particular user (i.e., a client device associated with the particular user). These messages may be analyzed to determine context regarding the user (e.g., the user's expertise or interest in a topic may be determined based on the frequency of mention of the topic or key words associated with the topic within such messages).

"Participant" in this context refers to users invited to (e.g., via an electronic calendar invite) and/or who join a call. Participants may be identified based on user identifying data, such as user profile data, user names, and/or the like. Participants may also be identified as being either an active participant that has actually joined a call, or an inactive participant that is invited to join a call but who does not actually join the call. Moreover, participants of recurring calls in particular may be identified as being either required participants—which are users that must be present on a call for it to occur, or optional participants—which are users that are invited to a call but which do not have to be present on the call for the call to occur. In other words, calls may be scheduled such that the schedules of required participants enable those participants to join the call, and optional participants may be invited to a call, even if the call overlaps with a scheduling conflict that prevents the optional participant from joining the call.

"Group-based communication platform" in this context refers to a collection of computing services that are accessible to one or more client devices, and that are operable to provide access to a plurality of software applications related to operations of databases. In some examples, the group-based communication platform may take the form of one or more central servers disposed in communication with one or more additional servers running software applications, and having access to one or more databases storing digital content items, application-related data, and/or the like. The group-based communication platform may also support client retention settings and other compliance aspects. Further, the group-based communication platform may provide comprehensive third party developer support that grants appropriate access to the data and allows third parties to build applications and bots to integrate with customer's workflows. Group-based communication platform users are organized into organization groups (e.g., employees of each company may be a separate organization group) and each organization group may have one or more communication channels (e.g., group-based communication channels) to which users may be assigned or which the users may join (e.g., group-based communication channels may represent departments, geographic locations such as offices, product lines, user interests, topics, issues, and/or the like). A group identifier may be used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier). Group-based communication system users may join and/or create communication channels (e.g., group-based communication channels). Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

"Channel identifier" in this context refers to one or more items of data by which a group-based communication channel may be identified. Channel identifiers may also be referred to as "group-based communication channel identifiers" in certain embodiments. For example, a group-based communication channel identifier may comprise ASCII text, a pointer, a memory address, and the like.

DESCRIPTION

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Overview

Participants and invitees of recurring meetings, such as recurring calls, video calls, in-person meetings, and/or the like often seek information/data exchange through a variety of data exchange avenues, such as email, discussions during the meetings themselves, and/or other data exchange avenues. These systems of communication are often disconnected and rely heavily on human participants identifying connections between various forms of communication so that appropriate information/data is exchanged among participants. Moreover, some recurring meetings may be scheduled based on the availability of certain (all or a subset) of meeting invitees, making some meetings particularly difficult to schedule on an ad hoc basis.

Accordingly, various embodiments overcome technological challenges associated with information/data exchange associated with recurring meetings. First, various embodiments identify recurring meetings automatically based on identified series of meetings within one or more calendars of participants and/or invitees through machine-learning based approaches for distinguishing between recurring meetings and non-recurring meetings. For those meetings identified as recurring meetings, various embodiments execute one or more follow-up actions, such as generation of a group-based communication channel enabling participants to exchange information/data easily. The group-based communication channel may be connected with other communication methodologies, such that the meetings themselves may take place via a call system in connection with the group-based communication channel. Moreover, various embodiments may automatically identify meeting recurrence frequencies to identify appropriate times for future meetings based on the participants and/or invitees of recurring meetings.

As discussed herein, certain embodiments are directed to systems and methods enabling a group-based communication platform to perform various actions relating to calls performed via integrated call functionalities of the group-based communication platform or via call functionalities provided via an external call system.

Specifically, the group-based communication platform is configured for identifying recurring calls (e.g., calls scheduled for and/or held on a regular and/or semi-regular basis) based on stored calendar data, such as historical calendar data regarding one or more previously concluded calls and/or prospective calendar data indicative of scheduled future calls between a plurality of users (e.g., via respective client devices). The group-based communication platform may utilize machine learning algorithms to identify recurring calls based at least in part on data indicative of the time and/or frequency of calls (previously concluded and/or future scheduled), the participants involved in calls (active participants of calls and/or invitees of calls), calendar data associated with various calls (e.g., call platform utilized, access credentials utilized, calendar invite titles, file names included with calendar invites, and/or the like), and/or the like. At least a portion of the data utilized for detection of recurring calls may be retrieved from external call systems and/or other external systems (e.g., calendar systems). Moreover, at least a portion of the data utilized for detection of recurring calls may be generated at client devices and/or based at least in part on the detected presence of one or more client devices in call connections. Such data may be usable for identifying active participants of calls and/or for distinguishing between absent invitees to calls and active participants of calls. Based at least in part on such data, the group-based communication platform may be configured to identify particular users as required participants for the recurring calls and/or optional participants for the recurring calls. Such labels for individual users may be usable by the group-based communication platform for identifying recommended times for later calls.

Upon identifying one or more recurring calls, the group-based communication platform may perform one or more follow-up actions relating to the identified recurring call. For example, the group-based communication platform may generate a new group-based communication channel (e.g., a private channel or a public channel) and may invite the members of the recurring call to the generated communication channel. These communication channels may be permanent communication channels (e.g., such that the communication channels exist unless and until a user removes the communication channel from the group-based communication platform) or temporary communication channels (e.g., such that the communication channel expires and is removed from the group-based communication platform according to a defined schedule, such as after a predefined time period after a call instance ends). The group-based communication platform may additionally provide links to call recordings and/or call transcripts (e.g., retrieved from an external call system) within the generated communication channel. The group-based communication platform may also recommend future call times based on calendar data for the participants of the call (e.g., based on the calendar data for users indicated as required participants for the recurring call) and the group-based communication platform may be configured to generate calendar appointments/meetings within the calendar data for the participants of the call (e.g., required participants and/or optional participants), including access code data indicative of an access code to be utilized for the recurring call instance.

Example System Architecture

Methods, apparatuses, and computer program products of the present invention may be embodied by any of a variety of devices. For example, the method, apparatus, and computer program product of an example embodiment may be embodied by a network device, such as a server or other network entity, configured to communicate with one or more devices, such as one or more client devices. In some preferred and non-limiting embodiments, the computing device may include fixed computing devices, such as a personal computer or a computer workstation. Still further, example embodiments may be embodied by any of a variety of mobile devices, such as a portable digital assistant (PDA), mobile phone, smartphone, laptop computer, tablet computer, wearable device, or any combination of the aforementioned devices.

FIG. 1 illustrates an example computing system 100 within which embodiments of the present invention may operate. Users may access a group-based communication platform 114 and/or an external call system 112 via a communication network 108 using client devices 102-106.

Communication network 108 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communication network 108 may include a cellular telephone, an 802.11, 802.16, 802.20, and/or WiMax network. Further, the communication network 108 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some embodiments, the protocol is a custom protocol of JSON objects sent via a websocket channel. In some embodiments, data may be transmitted via a plurality of protocols, such as JSON over RPC, JSON over REST/ HTTP, and the like.

In the illustrated embodiment, the group-based communication platform 114 includes an at least one message distribution server(s) 110 accessible via the communication network 108. Collectively, the at least one message distribution server(s) 110 is configured for receiving messages transmitted from one or more client devices 102-106, storing the messages within database storage areas for individual communication channels, transmitting messages to appropriate client devices 102-106, facilitating call connections to enable real-time data sharing between client devices 102-106, providing links to external call systems to initiate call connections between client devices 102-106, and/or the like.

The client devices 102-106 may be any computing device as defined above. Electronic message data and/or call data exchanged between the message distribution server(s) 110 and the client device 102-106 may be provided in various forms and via various methods.

In some preferred and non-limiting embodiments, one or more of the client devices 102-106 are mobile devices, such as smartphones or tablets. The one or more client devices may execute an "app" to interact with the message distribution server(s) 110 and/or one or more external call system. In certain embodiments, the external call system may be accessible to client devices 102-106 as a functionality of the app, however in other embodiments the external call system may be accessible to client devices 102-106 via separate apps executable by the client devices 102-106. In the latter instance, the app associated with the group-based communication platform may be configured to cause the client device to initialize an app associated with the external call system upon the initiation of a call utilizing the external call system. Such apps are typically designed to execute on mobile devices, such as smartphones or tablets. For example, an app may be provided that executes on mobile device operating systems such as Apple Inc.'s iOS®, Google Inc.'s Android®, or Microsoft Inc.'s Windows 10 Mobile®. These platforms typically provide frameworks that allow apps to communicate with one another, and with particular hardware and software components of mobile devices. For example, the mobile operating systems named above each provides frameworks for interacting with location services circuitry, wired and wireless network interfaces, user contacts, and other applications. Communication with hardware and software modules executing outside of the app and/or between apps is typically provided via application programming interfaces (APIs) provided by the mobile device operating system. Thus, via the app executing on the client devices 102-106, these client devices 102-106 are configured for communicating with the group-based communication platform 114.

In some preferred and non-limiting embodiments, the client devices 102-106 may interact with the message distribution server(s) 110 via a web browser. The client devices 102-106 may also include various hardware or firmware designed to interact with the message distribution server(s) 110 and/or external call systems 112. Again, via the browser of the client devices 102-106, the client devices 102-106 are configured for communicating with the group-based communication platform 114 and/or one or more external call systems 112.

In some embodiments of an exemplary group-based communication platform 114, a message or messaging communication may be sent from a client device 102-106 to a group-based communication platform 114. In various implementations, messages may be sent to the group-based communication platform 114 over communication network 108 directly by one of the client devices 102-106. The messages may be sent to the group-based communication platform 114 via an intermediary such as a message server, and/or the like. For example, a client device 102-106 may be a desktop, a laptop, a tablet, a smartphone, and/or the like that is executing a client application (e.g., a group-based communication app). In one implementation, the message may include data such as a message identifier, sending user identifier, a group identifier, a group-based communication channel identifier, message contents (e.g., text, emojis, images, links), attachments (e.g., file objects), message hierarchy data (e.g., the message may be a reply to another message), third party metadata, and/or the like. In one embodiment, the client device 102-106 may provide the following example message, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>ID_user_1</user_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
            //it should be noted that although several client details
            //sections are provided to show example variants of client
            //sources, further messages will include only on to save
            //space
        <client_IP> 10.0.0.123 </client_IP>
        <user_agent_string>Mozilla/5.0 (iPhone; CPU iPhone OS 7_1_1 like Mac OS X)
```

```
    AppleWebKit/537.51.2 (KHTML, like Gecko) Version/7.0 Mobile/11D201 Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>MSM.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac OS X)
    AppleWebKit/537.51.2 (KHTML, like Gecko) Version/7.0 Mobile/11D201 Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus S Build/IMM76D)
    AppleWebKit/534.30 (KHTML, like Gecko) Version/4.0 Mobile Safari/534.30</user_agent_string>
        <client_product_type>Nexus S</client_product_type>
        <client_serial_number>YXXXXXXXXXZ</client_serial_number>
        <client_UDID>FXXXXXXXXXX-XXXX-XXXX-XXXX-XXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3) AppleWebKit/537.75.14
    (KHTML, like Gecko) Version/7.0.3 Safari/537.75.14</user_agent_string>
        <client_product_type>MacPro5,1</client_product_type>
        <client_serial_number>YXXXXXXXXXZ</client_serial_number>
        <client_UDID>FXXXXXXXXXX-XXXX-XXXX-XXXX-XXXXXXXXXXXX</client_UDID>
        <client_OS>Mac OS X</client_OS>
        <client_OS_version> 10.9.3</client_OS_version>
        <client_app_type>web browser</client_app_type>
        <client_name>Mobile Safari</client_name>
        <client_version>537.75.14</client_version>
    </client_details>
    <message>
        <message_identifier>ID_message_10</message_identifier>
        <team_identifier>ID_team_1</team_identifier>
        <channel_identifier>ID_channel_ 1</channel_identifier>
        <contents>That is an interesting invention. I have attached a copy our patent policy.</contents>
        <attachments>patent_policy.pdf</attachments>
    </message>
</auth_request>
```

In the illustrated embodiment, the group-based communication platform 114 comprises a plurality of message distribution server(s) 110 configured to receive messages transmitted between a plurality of client devices 102-106 within a channel identified by a channel identifier and/or a group identifier, and to facilitate dissemination of those messages among client devices 102-106 that collectively form the membership of the communication channel.

In some embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel interface in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:

SELECT messageResponses
FROM MSM_Message
WHERE messageID=ID_message_10.

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In embodiments, attachments may be included with the message. If there are attachments, file objects may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In embodiments, third party metadata may be associated with the message. For example, third party metadata may provide additional context regarding the message or the user that is specific to a company, group, group-based communication channel, and/or the like. In one implementation, the message may be parsed (e.g., using PHP commands) to determine third party metadata. For example, third party metadata may indicate whether the user who sent the message is an authorized representative of the group-based communication channel (e.g., an authorized representative may be authorized by the company to respond to questions in the group-based communication channel).

In embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the channel) and/or proximity (e.g., message send order proximity, message send time proximity) of these messages.

In embodiments, various metadata, determined as described above, and/or the contents of the message may be used to index the message (e.g., using the conversation primitive) and/or to facilitate various facets of searching (i.e., search queries that return results from the message distribution servers 107). Metadata associated with the message may be determined and the message may be indexed in the message distribution server(s) 110. In one embodiment, the message may be indexed such that a company's or a group's messages are indexed separately (e.g., in a separate index associated with the group and/or company that is not shared with other groups and/or companies). In one implementation, messages may be indexed at a separate distributed repository (e.g., to facilitate data isolation for security purposes). If there are attachments associated with the message, file contents of the associated files may be used to index such files in the message distribution server(s) 110 to facilitate searching. In one embodiment, the files may be indexed such that a company's or a group's files are indexed at a separate distributed repository. Similarly, as discussed herein, app data associated with various external call systems and/or processing actions may be stored in association with a particular group's messages, such that app data associated with a plurality of groups are stored separately.

Examples of electronic message exchange among one or more client devices 102-106 and the group-based communication platform 114 are described below in reference to FIG. 1.

As shown in FIG. 1, the group-based communication platform 114 enables individual client devices 102-106 to exchange messages with one another and to interact with one or more external call systems 112. To exchange messages between client devices 102-106, individual client devices 102-106 transmit messages (e.g., text-based messages, file objects, video and/or audio streams, and/or the like) to the group-based communication platform 114. Those messages are ultimately provided to one or more message distribution server(s) 110, which indexes the messages and distributes those messages to the intended recipients (e.g., client devices 102-106) of the message.

In accordance with the embodiment shown in FIG. 1, the client devices 102-106 are configured to display the received messages in a contextually-relevant user interface available to the user of the client device. For example, messages transmitted from a first client device 102 as a part of a group-based communication channel are displayed in a user interface display on client devices 102-106 associated with other members of the group-based communication channel.

As discussed in greater detail herein, messages may be provided to external call systems 112-116 to initiate one or more calls (e.g., video- and/or audio-calls) executable within the respective external call system. In certain embodiments, calls may be executed to provide real time data exchange between client devices 102-106 of audio-based data and/or video-based data. Calls may be executed via integrated calling features of the group-based communication platform, such that call-related data is exchanged via one or more message distribution server(s) 110 of the group-based communication platform, or the calls may be executed via calling features of an external call system 112, such that call data is exchanged via one or more servers integrated with the respective external call system 112. As discussed herein, the calls may be recorded (e.g., by a message distribution server(s) 110 and/or by a server of a particular external call system 112), such that recordings and/or automatically generated call transcripts may be provided to a message distribution server(s) 110 and ultimately disseminated via a communication channel of the group-based communication platform 114

Example Apparatuses Utilized with Various Embodiments

Figure 2:
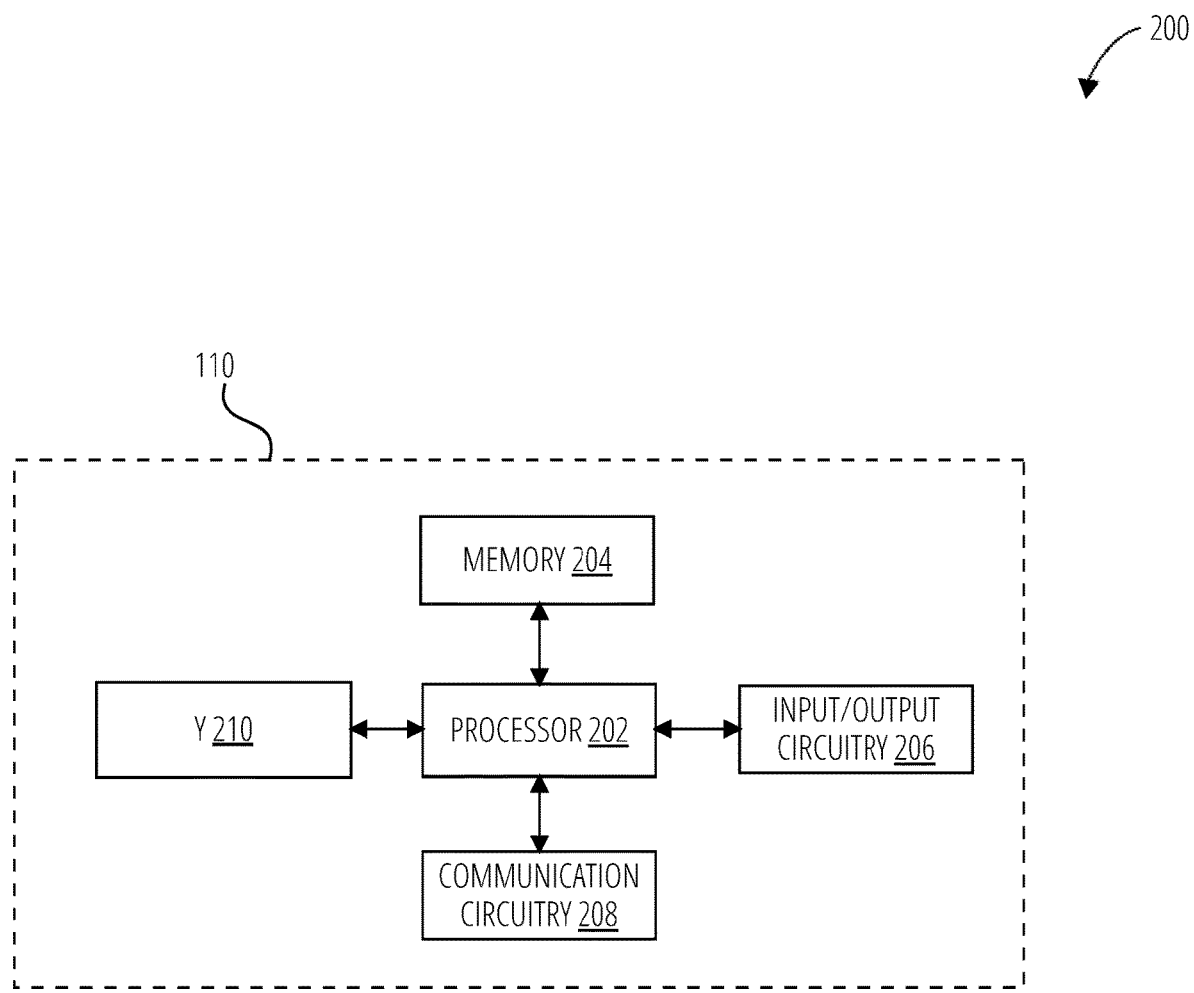
FIG. 2 illustrates an apparatus 200 of a message distribution server(s) 110 in accordance with one embodiment.

Each message distribution server(s) 110 may be embodied by one or more computing systems, such as apparatus 200 shown in FIG. 2. The apparatus 200 may include processor 202, memory 204, input/output circuitry 206, communications communication circuitry 208, and message amplifier circuitry 210. The apparatus 200 may be configured to execute the operations described herein with respect to FIG. 4. Although these components 202-210 are described with respect to functional limitations, it should be understood that the particular implementations necessarily include the use of particular hardware. It should also be understood that certain of these components 202-210 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or coprocessor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus 200 to carry out various functions in accordance with example embodiments of the present invention.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

As just one example, the processor 202 may be configured to maintain one or more communication channels connecting a plurality of client devices 102-106 to enable message sharing therebetween. The processor 202 ensures that messages intended for exchange between the client devices 102-106 within the particular communication channel are properly disseminated to those client devices 102-106 for display within respective display windows provided via the client devices 102-106.

Moreover, the processor 202 may be configured to synchronize messages exchanged on a particular communication channel with a database for storage and/or indexing of messages therein. In certain embodiments, the processor 202 may provide stored and/or indexed messages for dissemination to client devices 102-106.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display, and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communication circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communication circuitry 208 may include, for example, a network interface for enabling communications with a wired or wireless communication network. For example, the communication circuitry 208 may include one or more network interface cards, antennae, buses, switches, routers, modems, and supporting hardware and/or software, or any other device suitable for enabling communications via a network. Additionally or alternatively, the communication circuitry 208 may include the circuitry for interacting with the antenna/antennae to cause transmission of signals via the antenna/antennae or to handle receipt of signals received via the antenna/antennae.

Message amplifier circuitry 210 includes hardware configured to copy and amplify electronic messages and associated metadata received from one or more client devices 102-106 to other client devices 102-106 based on database shard(s). The message amplifier circuitry 210 may utilize processing circuitry, such as the processor 202, to perform these actions. However, it should also be appreciated that, in some embodiments, the message amplifier circuitry 210 may include a separate processor, specially configured Field Programmable Gate Array (FPGA), or Application Specific Integrated Circuit (ASIC) for performing the functions described herein. The message amplifier circuitry 210 may be implemented using hardware components of the apparatus 200 configured by either hardware or software for implementing these planned functions.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

The term "circuitry" should be understood broadly to include hardware and, in some embodiments, software for configuring the hardware. With respect to components of each apparatus 200, the term "circuitry" as used herein should therefore be understood to include particular hardware configured to perform the functions associated with the particular circuitry as described herein. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communication circuitry 208 may provide network interface functionality, and the like.

As will be appreciated, any such computer program instructions and/or other type of code may be loaded onto a computer, processor or other programmable apparatus's circuitry to produce a machine, such that the computer, processor or other programmable circuitry that execute the code on the machine creates the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Moreover, although not shown, various embodiments of a group-based communication platform may comprise one or more databases configured for storing and/or indexing messages exchanged within various group-based communication channels.

Figure 3:
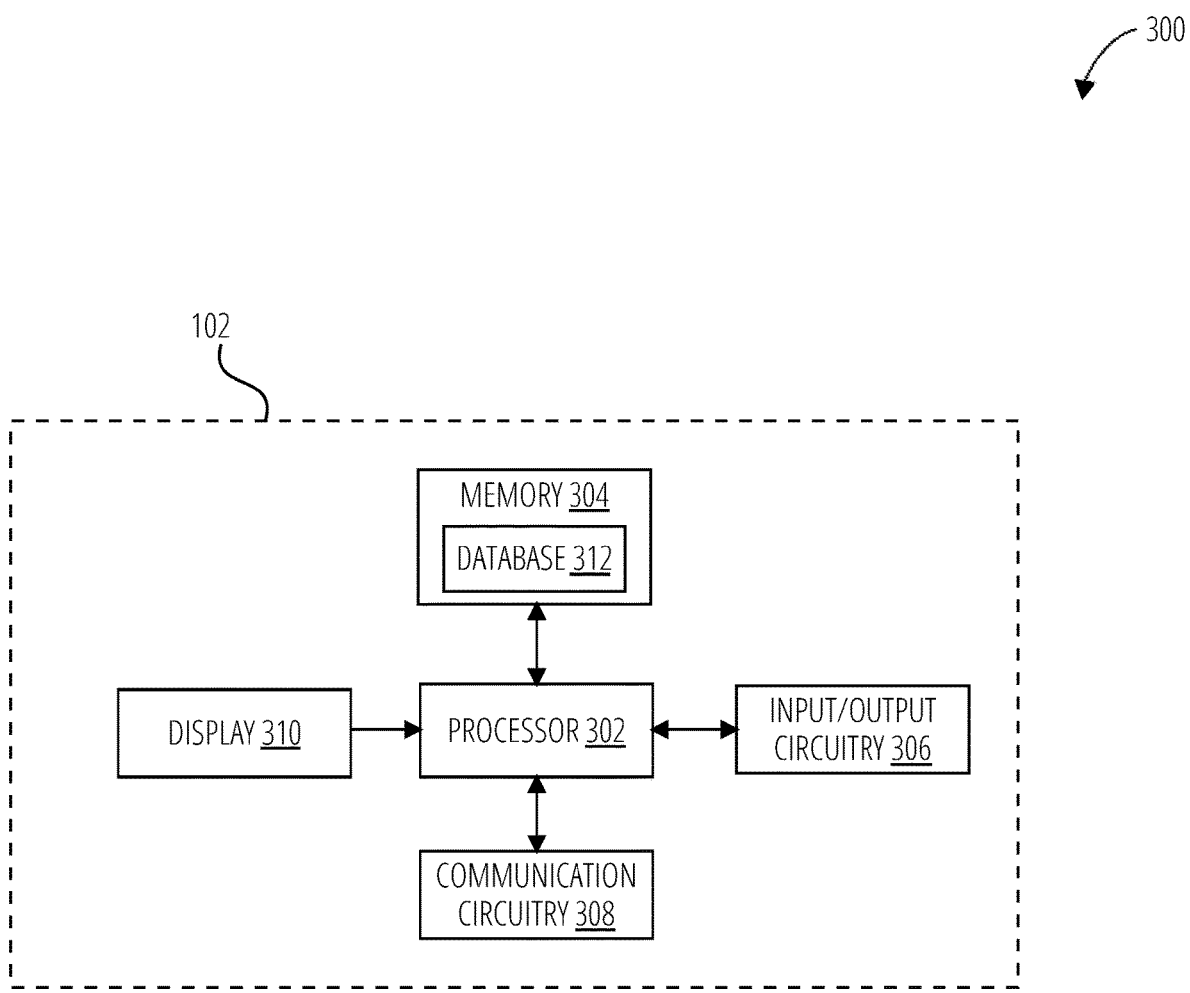
FIG. 3 illustrates an apparatus 300 of a client device in accordance with one embodiment.

Referring now to FIG. 3, a client device 102 (e.g., client devices 102-106) may be embodied by one or more computing systems, such as apparatus 300 shown in FIG. 3. The apparatus 300 may include processor 302, memory 304 which includes a database 312 (e.g., also referred to herein as permitted database 312), input/output circuitry 306, communication circuitry 308, and display 310. Although these components 302-312 are described with respect to functional limitations, it should be understood that the particular implementations necessarily include the use of particular hardware. It should also be understood that certain of these components 302-312 may include similar or common hardware. For example, two sets of circuitries may both leverage use of the same processor, network interface, storage medium, or the like to perform their associated functions, such that duplicate hardware is not required for each set of circuitries.

In some embodiments, the processor 302 (and/or co-processor or any other processing circuitry assisting or otherwise associated with the processor) may be in communication with the memory 304 via a bus for passing information among components of the apparatus. The memory 304 is non-transitory and may include, for example, one or more volatile and/or non-volatile memories. In other words, for example, the memory 304 may be an electronic storage device (e.g., a computer-readable storage medium). The memory 304 may include one or more databases. Furthermore, the memory 304 may be configured to store information, data, content, applications, instructions, or the like for enabling the apparatus 300 to carry out various functions in accordance with example embodiments of the present invention. The memory 304 may include a database 312 which may store group-based communication platform query data and/or data files indicative of prior activity of the client device 102 with respect to one or more communication channels (e.g., recent content exchange; recent views of group-based communication channels; and/or the like). These data files may be utilized by the processor 202 when crafting search parameters (e.g., automatically) to be presented to the message distribution server(s) 110 when searching for group-based communication channels.

The processor 302 may be embodied in a number of different ways and may, for example, include one or more processing devices configured to perform independently. In some preferred and non-limiting embodiments, the processor 302 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 302 may be configured to execute instructions stored in the memory 304 or otherwise accessible to the processor 302. In some preferred and non-limiting embodiments, the processor 302 may be configured to execute hard-coded functionalities. As such, whether configured by hardware or software methods, or by a combination thereof, the processor 302 may represent an entity (e.g., physically embodied in circuitry) capable of performing operations according to an embodiment of the present invention while configured accordingly. Alternatively, as another example, when the processor 302 is embodied as an executor of software instructions (e.g., computer program instructions), the instructions may specifically configure the processor 302 to perform the algorithms and/or operations described herein when the instructions are executed.

In some embodiments, the apparatus 300 may include input/output circuitry 306 that may, in turn, be in communication with processor 302 to provide output to the user and, in some embodiments, to receive an indication of a user input. The input/output circuitry 306 may comprise a user interface and may include a display 310, and may comprise a web user interface, a mobile application, a client device, a kiosk, or the like. In some embodiments, the input/output circuitry 306 may also include a keyboard, a mouse, a joystick, a touch screen, touch areas, soft keys, a microphone, a speaker, a camera (e.g., a video camera and/or a still camera) or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like). For example, a microphone and/or a video camera may be initiated to collect data upon initiation of a call.

The communication circuitry 308 may be any means such as a device or circuitry embodied in either hardware or a combination of hardware and software that is configured to receive and/or transmit data from/to a network and/or any other device, circuitry, or module in communication with the apparatus 300. In this regard, the communication circuitry 308 may include, for example, a network interface for enabling communications with a wired or wireless communication network. For example, the communication circuitry 308 may include one or more network interface cards, antennae, buses, switches, routers, modems, and supporting hardware and/or software, or any other device suitable for enabling communications via a network. Additionally or alternatively, the communication circuitry 308 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

Recurring Call Detection

Figure 4:
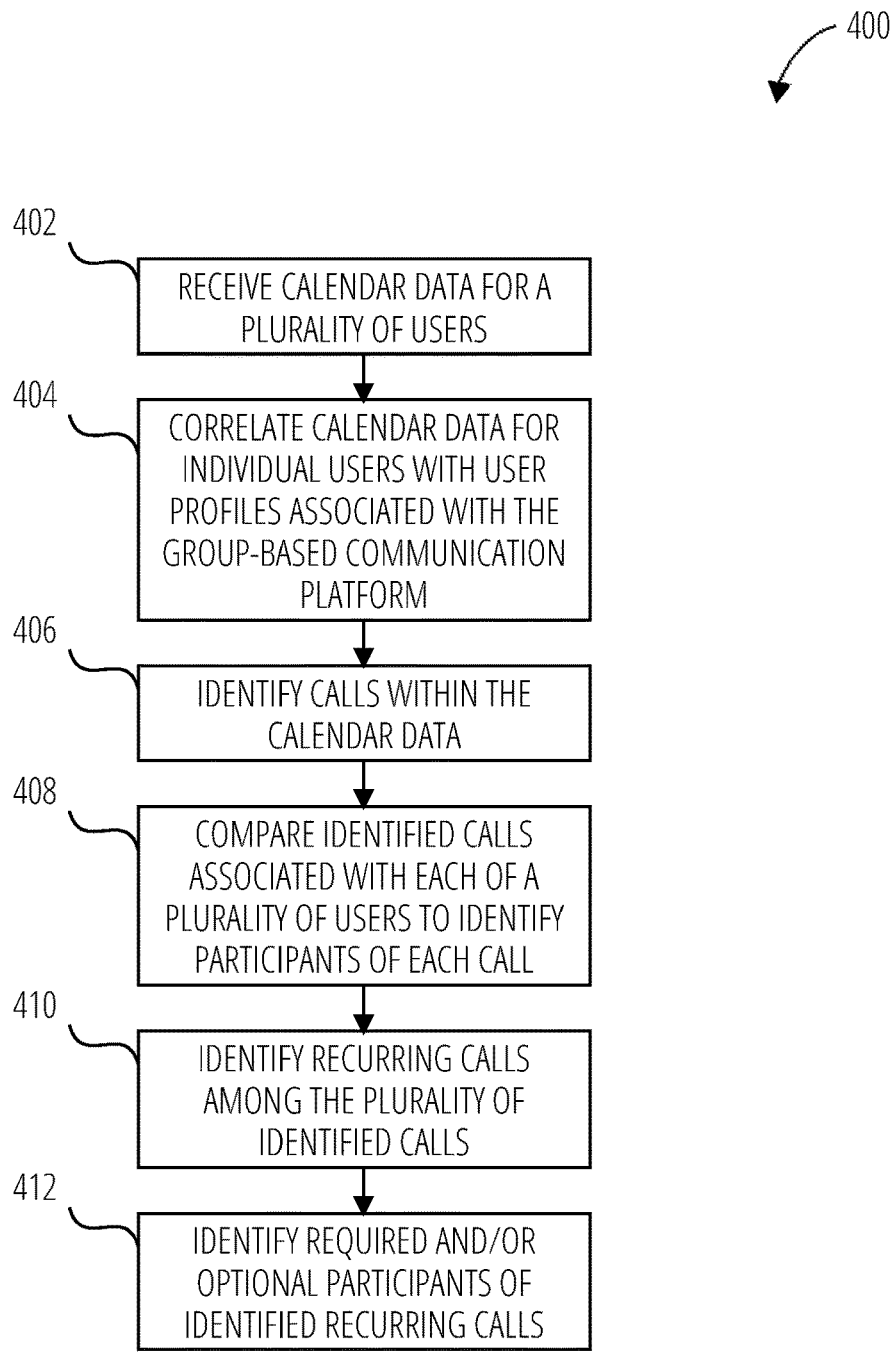
FIG. 4 illustrates a flowchart 400 including various functions performed by a group-based communication platform for identifying recurring calls in accordance with one embodiment.

FIG. 4 illustrates various steps performed by a group-based communication platform 114 for identifying recurring calls occurring between a plurality of users and/or client devices 102-106. As discussed herein, the group-based communication platform 114 is configured for identifying recurring calls between users of the group-based communication platform 114 based on calendar data stored in association with the group-based communication platform 114 and/or calendar data stored in association with one or more external calendaring systems, and accordingly the group-based communication platform 114 is configured for correlating calendar data with one or more user profiles stored in association with the group-based communication platform 114 prior to identifying recurring meetings. Moreover, the group-based communication platform 114 is further configured for distinguishing between active (present) and inactive (absent) participants of various calls, for example, to distinguish between required and optional participants of calls, and therefore the group-based communication platform 114 is further configured for receiving data indicative of which client devices 102-106 were connected with a call platform (e.g., embodied as a feature of the group-based communication platform 114 or as a feature of an external call system 112) during an instance of a call within a series of recurring calls.

With reference to FIG. 4, the group-based communication platform 114 receives calendar data for a plurality of users, as indicated at block 402. The calendar data may comprise historical and/or prospective calendar data for particular users, indicative of previously-completed calendar events, currently on-going calendar events, and future-scheduled calendar events. This calendar data may identify event characteristic data (e.g., call characteristic data for calls) for each of the various calendar events, such as titles of the various calendar events, locations (or call identification data) for calls, notes associated with calendar events, invited participants of the call (e.g., identified from the perspective of the user for which the calendar data is associated), files shared as a part of the calendar event, and/or the like. As mentioned, this calendar data may be received from a local data storage repository in association with the group-based communication platform 114, or the calendar data may be received from an external data storage repository, for example, stored in association with an external calendar system. In the former embodiment, the calendar data may be stored in association with a particular user identifier, and invitees may be likewise identified based on group-based communication platform 114 user identifiers. However, in embodiment in which the calendar data is received from an external calendar system, the calendar data may be correlated with a particular user identifier for which the calendar data is imported into the group-based communication platform 114, as indicated at block 404. User identifiers for invited participants of various events may be identified by cross-referencing calendar data imported for a plurality of users to identify overlapping calendar events between users and/or by correlating portions of the calendar data for particular calendared events identifying invited participants with user identifiers stored in association with the group-based communication platform 114.

As indicated at block 406 of FIG. 4, the group-based communication platform 114 identifies calls within the received calendar data for various users. In certain embodiments, calls may be identified by reviewing data within each calendar event to identify a location and/or a call identifier associated with the calendar event. Upon determining that a call identifier is stored therein, the group-based communication platform 114 may be configured to identify the particular calendar event as a call. In other embodiments, the group-based communication platform 114 may be configured for cross-referencing at least a portion of the calendar data (e.g., historical calendar data) with data indicative of completed calls, which may be received from a memory storage area associated with the group-based communication platform 114 and/or from an external call system 112 to identify completed calls overlapping calendar events identified within the received calendar data and having participants shared with the overlapping calendar events (e.g., identified based on user identifiers associated with the historical call data and the calendar data). Those calendar events identified as having corresponding and overlapping call data (e.g., having overlapping participants) may be identified as calls by the group-based communication platform 114.

The group-based communication platform 114 may be further configured to identify various participants, as well as the participant classifications of those participants, for each of identified calls, as indicated at block 408. Initially, the group-based communication platform 114 may be configured to identify invited participants identified within the calendar data as call participants. Those call participants may be further divided into active participants (those participants who actually participated in a call) and inactive participants (those participants who were invited to a call, but who were absent from the call) based at least in part on calendar data, and/or historical call data. The calendar data may be indicative of whether various participants accepted invitations to join a particular call. Those participants who declined an invitation may be identified by the group-based communication platform 114 as inactive participants of the call.

In other embodiments, the group-based communication platform 114 is configured to distinguish between active and inactive call participants based at least in part on historical call data collected by the group-based communication platform 114 and/or an external call system 112 while the call is ongoing. The group-based communication platform 114 and/or the external call system 112 may be configured to identify client devices 102-106 connected to a call platform while a call is on-going, for example, by monitoring IP addresses, MAC addresses, and/or the like associated with client devices 102-106 that are connected with a particular call, and to associate those identified client devices 102-106 with particular user identifiers to determine which users actively participated in a call. Accordingly, as suggested herein, a client device participating in a call provides some identifying data to a calling platform (e.g., the group-based communication platform 114 or external call system 112), thereby enabling the calling platform to identify the participating client devices. This identifying data may be simply an IP address and/or MAC address associated with the participating client devices, or the identifying data may comprise user identifiers associated with the call platform. For example, calls may be initiated and/or joined by a client device via an app associated with the call platform only after a user provides identifying data (e.g., a user identifier) to the app of the client device. Thus, when the client device thereafter connects to a call via the app, the client device provides the user identifier data to the call platform (e.g., in addition to the IP address and/or MAC address of the client device), thereby enabling the call platform to identify whether a particular user actively participated in a call. Data indicative of the users who actively participated in the call may be provided to the group-based communication platform 114 (unless already stored thereon).

Because multiple users periodically join calls from a common client device (e.g., multiple users may be in single video-conference room during a call, such that the multiple users are all "using" a single client device to connect with the call), the group-based communication platform 114 and/or external call system 112 may be configured to supplement data indicative of active participants with additional data indicative of user input provided in response to prompts asking users whether they participated in a recently-concluded call. For example, after a call is concluded for which a user accepted a call invitation but the user did not use their own client device to join the call, the group-based communication platform 114 and/or external call system 112 may provide a prompt to the user via their respective client device asking whether the user participated in the recently concluded call (e.g., the prompt may ask "Did you join someone else on the recent call?" and may provide the user with two user interface options a "yes—I attended" button and a "no—I skipped" button). Thus, for each call, the group-based communication platform 114 may be configured to compile a listing of active participants and a listing of inactive participants for the call.

As indicated at block 410, the group-based communication platform 114 of certain embodiments is configured to identify recurring calls of the plurality of identified calls. The group-based communication platform 114 may utilize machine-learning to identify recurring calls within the identified plurality of calls based on various characteristics of the identified calls. For example, the group-based communication platform 114 may consider relative frequency of calls having one or more common participants, common titles (e.g., identical titles or similar titles identified via fuzzy logic algorithms), common call identification data, and/or the like. By using machine-learning algorithms, such as supervised machine learning algorithms, the group-based communication platform 114 may be configured for identifying recurring calls occurring on irregular frequency schedules. For example, a recurring call series may be identified as having a call approximately every 3 weeks, although certain calls may be shifted up to 1 week to accommodate participant schedules. Although the calls within the recurring call series do not occur on precise, regular frequencies, these calls are may still be identified as linked within a single recurring call series by the group-based communication platform 114.

Finally, the group-based communication platform 114 may be configured for identifying required and/or optional participants within a particular recurring call series, for example, based on historical data. Again, the group-based communication platform 114 may utilize machine learning algorithms to review data indicative of prior active participants and inactive participants within the identified calls within the recurring call series to determine which participants are required for a particular call within the recurring call series to occur, and which participants are optional for the call series. For example, the group-based communication platform 114 may identify participants that are active in a majority (e.g., greater than 50%, greater than 60%, greater than 70%, greater than 80%, greater than 90%, and/or the like) of calls within the recurring call series, and/or participants that are active in all of the calls identified within a recurring call series. These participants (e.g., the user identifiers associated with these participants) may be identified as required participants if the frequency with which they are active in calls of the recurring call series satisfies a determined threshold (e.g., a threshold defined by a user or a threshold defined by the machine-learning algorithm). The remaining participants, if any, may be identified as optional participants for the recurring call series. As discussed in greater detail herein, the identification of a particular participant as a required participant or an optional participant may impact the actions performed by the group-based communication platform 114 with respect to future calls within the recurring call series.

Recurring Call Actions

Figure 5:
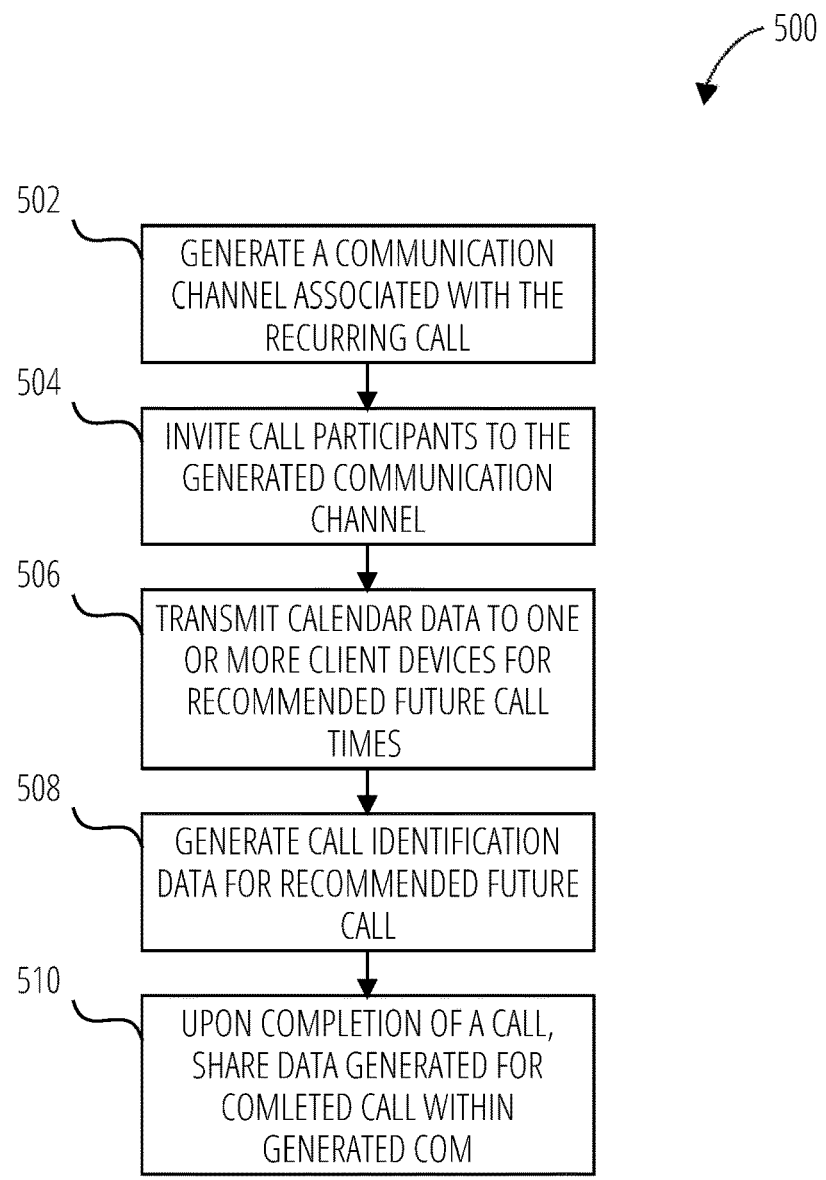
FIG. 5 illustrates a flowchart 500 including various functions performed by a group-based communication platform upon identifying a recurring call in accordance with one embodiment.

As mentioned, the group-based communication platform 114 may be configured to perform one or more actions in association with the identification of various recurring calls. These actions may be configured to facilitate the scheduling of future calls within the recurring calls series and/or to facilitate communication among participants (e.g., required participants, optional participants, or both) of the recurring call series, and/or the like. FIG. 5 illustrates various actions that may be performed by the group-based communication platform 114 in association with identified recurring calls. Although illustrated as a flowchart 500 providing a series of steps that may be performed by the group-based communication platform 114, it should be understood that the various processes illustrated in FIG. 5 may be performed in any order, and certain embodiments may omit one or more of the steps illustrated therein.

As indicated at block 502 of FIG. 5, the group-based communication platform 114 may be configured to automatically generate a communication channel to be associated with the identified recurring call series. The group-based communication platform 114 may be configured to automatically generate the communication channel with a channel identifier indicative of one or more titles utilized for calls within the identified recurring call series. The group-based communication platform 114 may further invite at least a subset of participants of the calls (e.g., only required participants, only optional participants, and/or both) to join the generated communication channel, as indicated at block 504, thereby facilitating information sharing between participants within messages, files, and/or other data that may be shared between participants. Moreover, as discussed more specifically in reference to block 510, the group-based communication platform 114 may be configured to share automatically generated data associated with the recurring call series among participants via the automatically generated communication channel.

As indicated at block 506, the group-based communication platform 114 may be further configured for identifying recommended future call times for the recurring call series, considering a determined historical call frequency for calls within the recurring call series, as well as calendar data for one or more participants of the recurring call series. For example, the group-based communication platform 114 may be configured to compare calendar data for all of the required participants of the recurring call series to identify available time slots for which all of the required participants are able to join the recurring call. The group-based communication platform 114 may be configured for automatically generating calendar invitations to be provided to the participants (e.g., via integrated calendaring functionalities of the group-based communication platform 114 or via external calendar systems), and/or the group-based communication platform 114 may share an automatically generated message within the automatically generated communication channel providing one or more suggested times for holding a future iteration of the recurring call series. In certain embodiments, the group-based communication platform 114 is configured to accept user input from one or more client devices 102-106 to reschedule the automatically suggested next meeting time, for example, to accommodate the schedule of one or more optional participants.

In certain embodiments, the group-based communication platform 114 generates call identification data for future calls within the recurring call series. For calls made using a call platform integrated within the group-based communication platform 114, the group-based communication platform 114 may directly establish a calling channel that may be used (e.g., including calling channel identification data) by participants to join later iterations of the recurring call series. For calls made using a call platform of an external call system 112, the group-based communication platform 114 may transmit a request to the external call system 112 for the establishment of a particular calling channel for the recurring call series, and the external call system 112 may provide a response to the group-based communication platform 114 including calling channel identification data that may be passed along to the recurring call series participants (e.g., within the automatically generated communication channel).

As indicated at block 510, the group-based communication platform 114 may be further configured to share data generated in association with particular instances of the recurring call series (e.g., individual calls), for example, via the generated communication channel. For those calls made using a call platform of the group-based communication platform 114, the group-based communication platform 114 may record the call and/or automatically generate a transcript of the call, and may share the generated recording and/or transcript of the call with the participants (e.g., via the generated communication channel). In embodiments in which the calls are made using a call platform of an external call system 112, the group-based communication platform 114 may receive one or more files generated by the external call system 112 (e.g., a recording and/or a transcript of the call), and may share the received files with the participants of the recurring call series via the generated communication channel.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system configured for initiating an action within a group-based communication platform for a recurring call, wherein the system comprises:
   one or more non-transitory memory storage repositories; and
   one or more processors, wherein the one or more processors are collectively configured to:
      receive calendar data identifying a plurality of calls between a plurality of users, wherein respective calendar data for a call of the plurality of calls comprises call characteristic data for the call;
      detect, via machine-learning, one or more recurring calls from the plurality of calls, wherein a recurring call comprises a series of calls detected within the plurality of calls; and
      initialize one or more follow-up actions within the group-based communication platform for the recurring call of the one or more recurring calls, wherein the one or more follow-up actions are associated with one or more user identifiers correlated with a subset of the calendar data associated with the recurring call, and wherein initializing the one or more follow-up actions comprises at least:
         generating a group-based communication channel in the group-based communication platform, the group-based communication channel comprising a data channel for sharing messages between a specific set of computing devices; and
         inviting one or more users corresponding to the one or more user identifiers to join the group-based communication channel based at least in part on the recurring call.

2. The system of claim 1, wherein the calendar data comprises historical calendar data indicative of previously completed calls.

3. The system of claim 1, wherein the one or more processors are further configured to:
   identify, based at least in part on call data generated while a present call is ongoing, one or more user profiles associated with users connected to the present call.

4. The system of claim 3, wherein the call data is generated by an external call system hosting the present call; and
   wherein identifying the one or more user profiles associated with the users connected to the present call comprises:
      receiving, from the external call system, user identifiers associated with the users connected to the present call; and
      mapping the user identifiers with one or more respective user identifiers stored in association with the group-based communication platform.

5. The system of claim 1, wherein the one or more processors are further configured to:
   classify user identifiers relative to a corresponding recurring call, wherein initializing the one or more follow-up actions comprises selecting a follow-up action based at least in part on classifications of the user identifiers relative to the corresponding recurring call.

6. The system of claim 5, wherein classifying the user identifiers comprises classifying each of the user identifiers as one of: an active participant of the corresponding recurring call or an inactive participant of the corresponding recurring call.

7. The system of claim 1, wherein detecting the one or more recurring calls comprises detecting the one or more recurring calls based at least in part on identifying a plurality of calendar events within the calendar data having shared call characteristic data.

8. A non-transitory computer-readable storage medium for initiating an action within a group-based communication platform for a recurring call, the non-transitory computer-readable storage medium storing one or more programs, the one or more programs comprising instructions, which when executed by one or more processors of an electronic device having a display, cause the electronic device to:
   receive calendar data identifying a plurality of calls between a plurality of users, wherein respective calendar data for a call of the plurality of calls comprises call characteristic data for the call;

detect, via machine-learning, one or more recurring calls from the plurality of calls, wherein a recurring call comprises a series of calls detected within the plurality of calls; and initialize one or more follow-up actions within the group-based communication platform for the recurring call of the one or more recurring calls, wherein the one or more follow-up actions are associated with one or more user identifiers correlated with a subset of the calendar data associated with the recurring call, and wherein initializing the one or more follow-up actions comprises at least:

generating a group-based communication channel in the group-based communication platform, the group-based communication channel comprising a data channel for sharing messages between a specific set of computing devices; and inviting one or more users corresponding to the one or more user identifiers to join the group-based communication channel based at least in part on the recurring call.

9. The non-transitory computer-readable storage medium of claim 8, wherein the calendar data comprises historical calendar data indicative of previously completed calls.

10. The non-transitory computer-readable storage medium of claim 8, further comprising an executable portion configured to:

identify, based at least in part on call data generated while a present call is ongoing, one or more user profiles associated with users connected to the present call.

11. The non-transitory computer-readable storage medium of claim 10, wherein the call data is generated by an external call system hosting the present call; and wherein identifying the one or more user profiles associated with the users connected to the present call comprises:

receiving, from the external call system, user identifiers associated with the users connected to the present call; and mapping the user identifiers with one or more respective user identifiers stored in association with the group-based communication platform.

12. The non-transitory computer-readable storage medium of claim 8, further comprising an executable portion configured to:

classify user identifiers relative to a corresponding recurring call, wherein initializing the one or more follow-up actions comprises selecting a follow-up action based at least in part on classifications of the user identifiers relative to the corresponding recurring call.

13. The non-transitory computer-readable storage medium of claim 12, wherein classifying the user identifiers comprises classifying each of the user identifiers as one of: an active participant of the corresponding recurring call or an inactive participant of the corresponding recurring call.

14. The non-transitory computer-readable storage medium of claim 8, wherein detecting the one or more recurring calls comprises detecting the one or more recurring calls based at least in part on identifying a plurality of calendar events within the calendar data having shared call characteristic data.

15. A computer-implemented method for initiating an action within a group-based communication platform for a recurring call, wherein the computer-implemented method comprises:

receiving calendar data identifying a plurality of calls between a plurality of users, wherein respective calendar data for a call of the plurality of calls comprises call characteristic data for the call;

detecting, via machine-learning, one or more recurring calls from the plurality of calls, wherein a recurring call comprises a series of calls detected within the plurality of calls; and initializing one or more follow-up actions within the group-based communication platform for the recurring call of the one or more recurring calls, wherein the one or more follow-up actions are associated with one or more user identifiers correlated with a subset of the calendar data associated with the recurring call, and wherein initializing the one or more follow-up actions comprises at least:

generating a group-based communication channel in the group-based communication platform, the group-based communication channel comprising a data channel for sharing messages between a specific set of computing devices; and inviting one or more users corresponding to the one or more user identifiers to join the group-based communication channel based at least in part on the recurring call.

16. The computer-implemented method of claim 15, wherein the calendar data comprises historical calendar data indicative of previously completed calls.

17. The computer-implemented method of claim 15, further comprising:

identifying, based at least in part on call data generated while a present call is ongoing, one or more user profiles associated with users connected to the present call.

18. The computer-implemented method of claim 17, wherein the call data is generated by an external call system hosting the present call; and wherein identifying the one or more user profiles associated with the users connected to the present call comprises:

receiving, from the external call system, user identifiers associated with the users connected to the present call; and mapping the user identifiers with one or more respective user identifiers stored in association with the group-based communication platform.

19. The computer-implemented method of claim 15, further comprising:

classifying user identifiers relative to a corresponding recurring call, wherein initializing the one or more follow-up actions comprises selecting a follow-up action based at least in part on classifications of the user identifiers relative to the corresponding recurring call.

20. The computer-implemented method of claim 19, wherein classifying the user identifiers comprises classifying each of the user identifiers as one of: an active participant of the corresponding recurring call or an inactive participant of the corresponding recurring call.

21. The computer-implemented method of claim 15, wherein detecting the one or more recurring calls comprises detecting the one or more recurring calls based at least in part on identifying a plurality of calendar events within the calendar data having shared call characteristic data.

* * * * *